A. A. York,
Horse Shoe.
No. 91,996. Patented June 29, 1869.
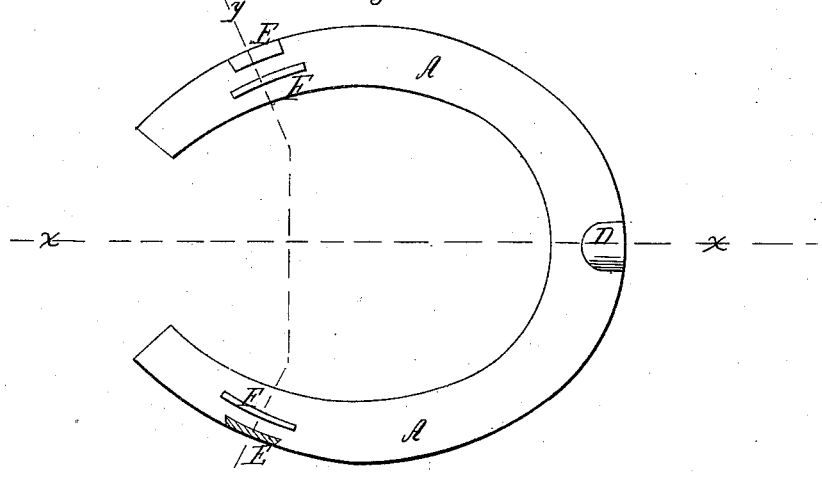
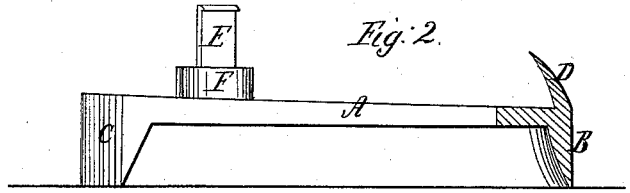
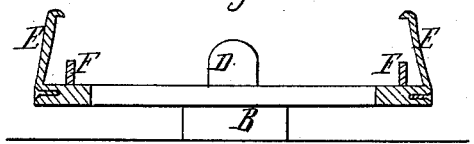
Witnesses;
J. W. B. Covington
Wm. Trevin
Inventor;
A. A. York
Per Munn & Co
Attorneys

United States Patent Office.

ALBERT A. YORK, OF DE LANCEY, NEW YORK.

Letters Patent No. 91,996, dated June 29, 1869.

IMPROVEMENT IN HORSESHOES.

The Schedule referred to in these Letters Patent and making part of the same

*To all whom it may concern:*

Be it known that I, ALBERT A. YORK, of De Lancey, Madison county, State of New York, have invented a new and useful Improvement in Horseshoes; and I do hereby declare that the following is a full, clear, and exact description thereof, which will enable others skilled in the art to make and use the same, reference being had to the accompanying drawing, forming part of this specification, in which—

Figure 1 is a top view of my improved horseshoe.

Figure 2 is a sectional view of the same, taken through the line $x$ $x$, fig. 1.

Figure 3 is a sectional view of the same, taken through the line $y$ $y$, fig. 1.

Similar letters of reference indicate like parts.

My invention has for its object to furnish an improved horseshoe, to be attached to the horse's hoof without the use of nails or screws; and it consists of an improved horseshoe formed by combining a set of clasps and lips, constructed and arranged as hereinafter more fully described.

A is the main part or body of the horseshoe, which is made in the ordinary manner, except that there are no holes formed in it for the nails.

B is the toe-calk, and C are the heel-calks, which are also made in the usual manner.

Upon the upper front edge of the shoe is formed a clasp, D, which fits over the front end or toe of the hoof, and holds the toe of the shoe firmly in place. In the edges of the shoe, about one-third of the way from the heel or rear end of the shoe to the toe, are formed dovetailed grooves, as shown in fig. 1. Into these grooves are fitted the lower ends of the side-clasps E. These clasps are further secured to the edges of the shoe by screws passing through the said clasps and screwing into the body of the shoe, as shown in fig. 3.

Upon the upper ends of the clasps E are formed hooks, which sink into the outer surface of the hoof and hold the shoe securely to its place.

When attaching the shoe to the horse's foot, the toe of the hoof is inserted beneath the toe-clasp D, and the clasps E are sprung into their places. This secures the shoe firmly to the foot.

To prevent the clasps E from pressing the sides of the hoof inward, and injuring the foot, lips F are formed upon the upper side of the body A of the shoe, at such a distance from the clasps E that the shell, on lower edge of the hoof, may rest upon the body A of the shoe, between the clasps E and the lips F, and thus receive and sustain the pressure of the clasps E.

Shoes constructed in this way may be attached to the horse's foot by anyone of ordinary capacity, without its being neccessary to take the horse to the blacksmith every time a shoe requires to be set.

I claim as new, and desire to secure by Letters Patent—

The lips F, and the removable, elastic, angular clasps E, in combination with the shoe A, whereby the shell of the horse's hoof is adapted to rest upon the shoe, between the lip and clasps, to prevent it from being bent inward and broken, as herein shown and described.

The above specification of my invention signed by me, this 2d day of March, 1866.

ALBERT A. YORK.

Witnesses:
THOS. A. CRANDALL,
JOHN T. G. BAILEY.